J. W. PORCH.
PULLING IMPLEMENT.
APPLICATION FILED MAY 1, 1919.
1,326,965.
Patented Jan. 6, 1920.
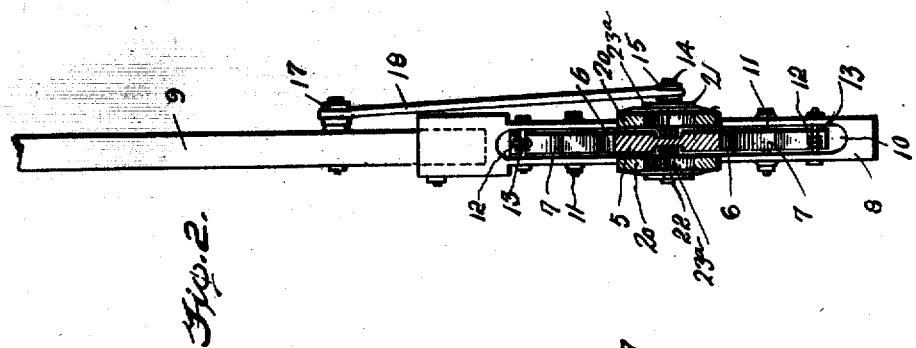
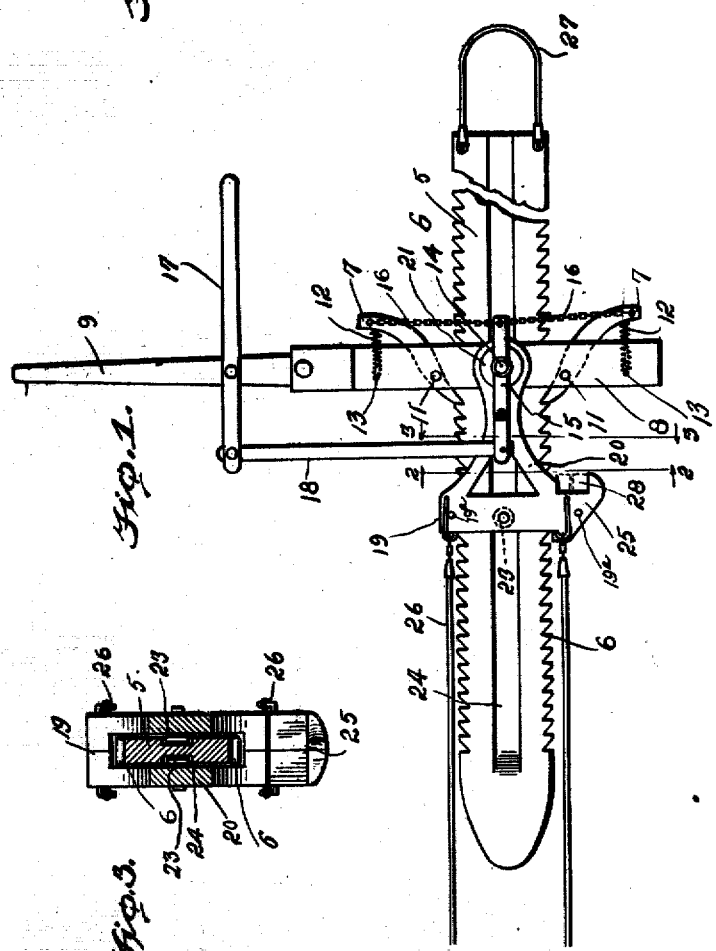
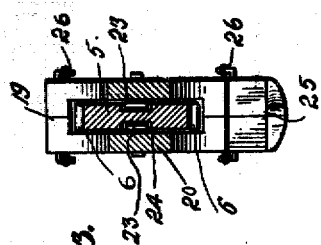
Inventor
J. W. Porch.
By
Attorneys

UNITED STATES PATENT OFFICE.

JAMES W. PORCH, OF HURRICANE MILLS, TENNESSEE.

PULLING IMPLEMENT.

1,326,965.　　　　Specification of Letters Patent.　　Patented Jan. 6, 1920.

Application filed May 1, 1919. Serial No. 293,918.

*To all whom it may concern:*

Be it known that I, JAMES W. PORCH, citizen of the United States, residing at Hurricane Mills, in the county of Humphreys and State of Tennessee, have invented new and useful Improvements in Pulling Implements, of which the following is a specification.

This invention relates to implements for pulling on wire fencing to stretch the same, and also for stretching other articles, as well as for pulling stumps out of the ground.

The invention has for its object to provide a very strong and easily operated implement of the kind stated, and to this end it consists in a novel combination and arrangement of parts to be hereinafter described and claimed.

In order that the invention may be better understood, reference is had to the accompanying drawing forming a part of this specification, and in said drawing, Figure 1 is an elevation of the implement, and Figs. 2 and 3 are enlarged cross-sections on the lines 2—2 and 3—3, respectively, of Fig. 1.

Referring specifically to the drawing, 5 denotes a rack bar having teeth 6 on its opposite edges which are engageable by pivoted pawls 7 carried by an oscillatory supporting member 8 extending transversely of the rack bar and having a handle 9 connected to one of its ends. The member 8 has a longitudinal recess 10 through which the rack bar passes, and the pawls extend through said recess and are pivoted on pins 11 extending across the latter. To the rear ends of the pawls are connected springs 12 which are anchored to pins 13 extending across the recess 10, said springs serving to swing the pawls into engagement with the teeth of the rack bar.

On the member 8, midway between the pawls 7, is the pivot pin 14 thereof, on which is fulcrumed a lever 15 having one of its ends connected by oppositely extending chains 16 to the rear ends of the pawls, so that when the lever is swung in one direction, one of the pawls is swung clear of and disengaged from the rack bar 5, whereas a swing of the lever in the opposite direction, disengages the other pawl. On the handle 9 is fulcrumed a hand lever 17 which is connected by a link 18 to the lever 15 for operating the latter. Any other operating means may be provided.

On the rack bar 5 is also mounted a slide 19, the same being shaped to fit around the same. This slide has a rearward extension 20 which has spaced portions fitting opposite sides of the rack bar, and through one of which the pivot pin 14 passes, whereby a connection between the slide and the member 8 is made. One side of the part 20 is connected to the pin 14, with a spacing washer 21 between said part and the lever 15, and the other side is connected to the corresponding side of the member 8 by a pivot pin 22 which is in alinement with the pin 14. It will therefore be seen that a pivotal connection between the slide 20 and the pawl carrier member 8 is had to permit the latter to be oscillated. The sides of the slide 20 which are next to the rack bar 5 have guide rollers 23 which seat loosely in longitudinal grooves 24 in the rack bar, and the pins 14 and 22 carry similar guide rollers 23ᵃ.

On one side of the slide 19 is a laterally projecting hook 25 and the slide also carries hauling lines or cables 26. To the rear end of the rack bar 5 is connected an anchoring line or cable 27. It will be understood, of course, that chains may be used instead of cables.

In use, the bar 5 is anchored to a post or other stationary support by means of the cable 27, and the cables 26 are connected to the part to be stretched. The pawl carrier 8 is then oscillated by means of the handle 9, whereupon the slide 20 is moved in a direction to stretch the part to which it is connected by the cables 26. For stretching wire fences, the slide 19 can be hooked to a clamp shown dotted at 28 in Fig. 1, said clamp being attached to the wire strands. The device can also be used for pulling stumps by attaching the cables 26 to the latter.

For returning the slide 19 to the forward end of the rack bar 5 after the stretching or pulling operation, the pawls 7 are disengaged in alternate order, and the member 8 is operated as before. However, the member 8 must be swung to advance the pawl which is clear of the rack bar. Thus, if the pawl shown at the top of Fig. 1 is disengaged from the rack bar, the member 8 is swung to the left, which carries the pawl one or more teeth to the left end of the rack bar, after which said pawl is released to again engage the rack bar. The bottom pawl is now swung clear of the rack bar, and the member is swung to the right about the pivots 14 and 22, which carries this pawl toward the left end of the rack bar for a distance of one or more teeth. The top pawl is now again released and the member 8 is again swung to the left, and so on until the slide 19 has been returned toward the left end of the rack bar as far as desired, and the device is now again ready for use.

The device is very strong and durable, and it is well adapted for heavy work. The fulcrum of the pawl carrier is close to the pawls and the device is therefore powerful in action and well suited for any stretching or pulling operation to be effected manually. The parts 23 and 24 provide simple and efficient guide means for the slide 19 without making an opening in the rack bar 5 and thus weakening the same.

The preferred embodiment of the invention has been shown, but it will be evident that various changes and modifications may be made without a departure from the spirit and scope of the invention as claimed hereinafter.

The slide 19 is made in two parts as shown in Fig. 3 to permit ready assembly, the same being fastened together by bolts 19ª.

I claim:

A pulling implement comprising a rack bar having anchoring means, a slide shaped to fit around the rack bar and mounted for travel along the same, said slide having spaced rearwardly extending portions between which the rack bar seats, rollers carried by the slide at the inner faces thereof, the opposite sides of the rack bar having longitudinal grooves in which the rollers seat, means on the slide for anchoring the same to the part to be pulled, pawls engageable with the teeth of the rack bar, an oscillatory carrier for the pawls connected to the rearwardly extending portion of the slide, and operating means for the carrier.

In testimony whereof I affix my signature.

JAMES W. PORCH.